Aug. 6, 1940.    G. W. NEWBY    2,210,301
GAS FIRED BURNER
Filed Dec. 21, 1938
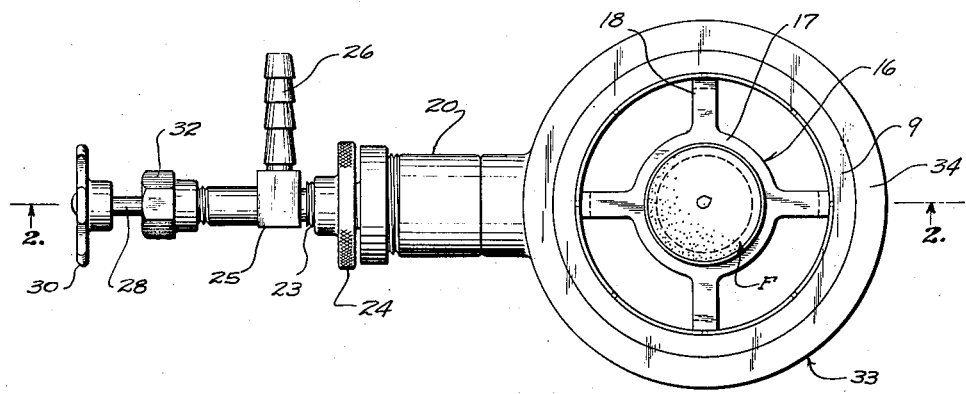
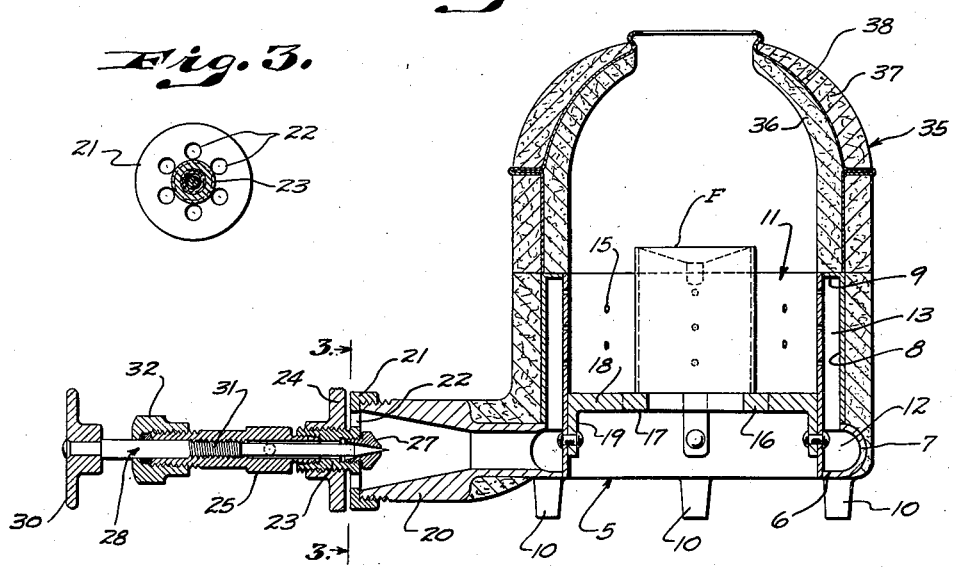
INVENTOR
Grant W. Newby
BY
John W. Michael
ATTORNEY Patented Aug. 6, 1940

2,210,301

UNITED STATES PATENT OFFICE 2,210,301

GAS FIRED BURNER

Grant W. Newby, Platteville, Wis.

Application December 21, 1938, Serial No. 247,016

3 Claims. (Cl. 158—7)

This invention relates to an improvement in laboratory burners especially designed and adapted for use by dentists, although adapted for various other uses and applications.

It is common practice in the dental art to heat flasks containing invested wax patterns to melt the wax. The wax on melting flows out through the passage formed as a consequence to the removal of the conventional sprue rod or wire. In this way a mold is formed in the investment material of a size and shape corresponding to the cavity to be filled. The mold so formed is employed to produce the desired dental casting.

I have found that best results in this type of work may be achieved by subjecting the flask to a certain specific temperature, usually about 1300° F., and by accomplishing this in such a way that the flask is uniformly as well as quickly raised in temperature.

Another object of the invention is to provide a laboratory burner which is so constructed and organized as to be effective to controllably heat the flask to the desired degree and to effect this while subjecting the entire flask to a uniform as well as a rapid heating action.

Another object of the invention is to provide a laboratory burner having these advantages and capacities and which is extremely simple and compact in its construction, readily and easily controlled and handled, reliable and efficient in operation, and easy and comparatively inexpensive to manufacture.

Other objects and advantages reside in certain novel features of the construction, arrangement, and combination of parts which will be hereinafter more fully described and particularly pointed out in the appended claims, reference being had to the accompanying drawing forming a part of this specification, and in which:

Figure 1 is a view in top plan showing a laboratory burner embodying the present invention, the hood or cover of the burner being removed;

Figure 2 is a view thereof in longitudinal vertical cross section taken on line 2—2 of Figure 1 but showing the hood or cover in place on the burner; and Figure 3 is a view in cross section taken on line 3—3 of Figure 2 and looking in the direction of the arrows.

Referring to the drawing, it will be seen that the burner embodying the present invention comprises an annular base designated generally at 5. The base 5 has a horizontal or radially extending bottom wall 6 and an outwardly bulged outer wall 7. As shown in Figure 2, this outwardly bulged wall 7 is integral with the bottom wall 6 and curved outwardly and upwardly and then inwardly and upwardly. A vertically disposed outer cylindrical wall 8 is provided and has its lower end or edge integral with the upper edge of the wall 7. At the upper end of the cylindrical wall 8 an inturned annular flange 9 is provided. Preferably the base 5 and the wall 8 and its flange 9 are all integral parts of a single casting. Projecting downwardly from the bottom wall 6 of the base 5 are angularly spaced supporting feet 10 which may also be formed as an integral part of the casting with which they are associated.

An inner vertically disposed cylindrical wall 11 is combined with the structure thus far described. This inner wall 11 may be of sheet metal and the outer periphery of each end thereof is snugly fitted or engaged with the inner circular edges of the flange 9 and bottom wall 6. Preferably the inner circular edges of the flange 9 and bottom wall 6 are vertically alined. The end portions of the inner wall 11 which engage these edges are hermetically and mechanically secured thereto. This may be accomplished by interfitting the parts with a tight press fit, by welding them, or by pressing them or soldering them together.

From the foregoing description and as shown in Figure 2, it will be seen that with the parts assembled in the manner described there is provided in the base 5 an annular manifold-like space or distributing tube 12 which freely communicates with an annular distributing chamber 13 extending up to the top of the burner structure. These spaces are entirely enclosed except as will be hereinafter pointed out.

The inner cylindrical wall 11 is provided with angularly spaced vertical rows of flame orifices 15. The combustible mixture introduced into the manifold 12 and completely commingled and formed into a combustible charge or mixture in the distributing chamber 13 issues as inwardly directed radial jets from these rows of openings 15 and when ignited provide the heating flames which are directed inwardly and radially, uniformly about and against the flask F.

For the purpose of supporting the flask in position a grid designated generally at 16, is provided and comprises a circular hub 17 and radial arms 18 terminating in downturned lugs 19 suitably fastened to the inner cylindrical wall 11.

In order to supply the air and gaseous fuel to the distributing tube 12 and distributing chamber 13 the base member 5 is formed with a radially projecting fitting 20. The fitting 20 is provided with a funnel-shaped passageway extending therethrough and forming an induction or mixing chamber. A cap 21 is threaded onto the outer end of this fitting and is provided with a circular series of air inlet openings 22. Centrally the cap has an outwardly projecting and exteriorly threaded nipple 23. The rate of flow of air through the inlet openings 22 is regulated or controlled by means of a disk-like valve member 24 which is threaded onto the nipple 23 and which may be adjusted toward and away from the inlet openings 22 by appropriate rotation. A gas fitting 25 is threadedly interconnected with the nipple and has a lateral connection 26 for attachment to a gas pipe or the like. A valve seat 27 is provided in the inner end of the nipple. A needle valve 28 coacts with this valve seat and may be adjusted toward and away from the seat by turning of its knob 30 thereof through the provision of a threaded connection 31 between a portion of the stem of the valve and the gas fitting. A packing gland 32 is provided for the outer end of the valve stem.

The provision made for regulating the volume of flow of gas, namely, the adjustment of the needle valve, and the provision made for the regulation of the amount of air into the induction chamber, make it practical to obtain just the correct proportion of air and gas. This, together with the practicability of varying the flame by increasing or decreasing the number and varying the size of the orifices, affords an effective control over the degree of heat which is generated by the burner.

This action is further enhanced and the heat generated concentrated on the flask by the provision of an insulating jacket 33 which surrounds and is structurally united to the outside of the wall 8 and base 5. The upper edge of this insulation presents a flat seat 34 adapted along with the flange to be engaged by the lower end of a hood or cover designated generally at 35. The hood consists of two layers, 36 and 37, of insulating material interconnected by a sheet metal inner shell 38. The layers of insulation are adhesively united to their supporting metal shell and just as the insulating jacket is adhesively united to the burner proper.

As shown in the drawing, the lower section of the hood 35 is of cylindrical form in order to conform it to and adapt it to rest firmly and securely upon the top of the burner proper. The upper section thereof is inwardly curved or domed and provided with a central opening or vent. In this way the heat generated is concentrated on the flask but provision is made for an upwardly flowing draft through the device to insure optimal combustion conditions therein.

While I have shown and described one construction in which the invention may be advantageously embodied, it is to be understood that the construction shown has been selected merely for the purpose of illustration or example and that various changes in the size, shape and arrangement of the parts may be made without departing from the spirit of the invention or the scope of the subjoined claims.

The invention claimed is:

1. A burner comprising a base member forming an annular distributing tube, an induction chamber connected to said tube, a distributing chamber opening directly into and extending up from said tube, said distributing chamber having a cylindrically shaped inner wall forming a central flue-like passage, flame orifices in said inner wall, a grid having a flat hub portion suspended within said passage in direct passage relation with said orifices, and a dome-shaped vented hood removably positioned on said distributing chamber over said passage.

2. A burner comprising a base member forming an annular distributing tube, an induction chamber extending laterally from and connected to said tube, a distributing chamber opening directly into and extending up from said tube, said distributing chamber having a cylindrically shaped inner wall forming a central flue-like passage, flame orifices in said inner wall, a grid having a flat hub portion suspended within said passage in direct passage relation with said orifices by radially spaced arms, a dome-shaped vented hood removably positioned on said distributing chamber over said passage, and legs on said base member whereby air is permitted to enter into said passage.

3. A combined burner and furnace comprising an induction chamber for supplying a combustible mixture, an annular distributing tube and upwardly projecting distributing chamber defining a flue-like passage therethrough, orifices in said distributing chamber opening into said passage, a flask supporting grid in said passage, an insulating jacket covering the sides of said tube and distributing chamber and forming with said distributing chamber a flat seat, and a dome-shaped hood formed of layers of insulation united to both sides of a supporting shell, said hood having an upper central vent and a lower edge adapted to engage and rest upon said flat seat.

GRANT W. NEWBY.